United States Patent [19]

Takenaga et al.

[11] Patent Number: 4,488,196
[45] Date of Patent: Dec. 11, 1984

[54] REMOTE CONTROL DEVICE FOR TAPE RECORDER

[75] Inventors: Hideo Takenaga; Hiroki Ichikawa; Shunichi Orita, all of Tokyo, Japan

[73] Assignee: Olympus Optical Co., Ltd., Tokyo, Japan

[21] Appl. No.: 356,417

[22] Filed: Mar. 9, 1982

[30] Foreign Application Priority Data

Oct. 3, 1981 [JP] Japan .............................. 56-33340[U]

[51] Int. Cl.³ ...................... G11B 15/18; G11B 19/02; G11B 17/00
[52] U.S. Cl. ........................................ 360/137; 369/28
[58] Field of Search ...................... 360/137, 72.1, 72.3, 360/71, 61, 69; 369/28, 29, 27

[56] References Cited

U.S. PATENT DOCUMENTS

| 4,214,281 | 7/1980 | Sato | 360/137 |
|---|---|---|---|
| 4,345,114 | 8/1982 | Sato | 360/137 |
| 4,398,279 | 8/1983 | Titus | 360/137 |
| 4,399,527 | 8/1983 | Titus | 369/28 |
| 4,410,923 | 10/1983 | Patel | 360/137 |
| 4,413,328 | 11/1983 | Videki | 360/137 |

Primary Examiner—Robert Martin Kilgore
Attorney, Agent, or Firm—Toren, McGeady and Stanger

[57] ABSTRACT

A remote control device for tape recorder is disclosed. The device comprises a microphone unit to be connected to a microphone amplifier system provided in a body of the tape recorder, various kinds of operating switches to be connected to a main control circuit provided in the tape recorder body, and a display means connected to the microphone and to be connected to the microphone amplifier system.

10 Claims, 3 Drawing Figures

REMOTE CONTROL DEVICE FOR TAPE RECORDER

BACKGROUND OF THE INVENTION

The present invention relates to a remote control device having a microphone for a tape recorder.

A recently developed tape recorder includes a remote control arrangement capable of actuating various operating modes such as recording and reproducing from a remote location.

FIG. 1 shows a remote control device for conventional tape recorder. Here a body 1 of a remote control device includes a microphone 2, mode operating switches such as a recording (REC) switch 3, a playing (PLAY) switch 4, and a stop (STOP) switch 5, and a display arrangement 15. The display arrangement 15 includes an input detecting circuit 6 for detecting the operating condition of the tape recorder, that is, whether the various operating modes are switched on or off, a display circuit 7 connected to the input detecting circuit 6 for displaying the operating condition of the various operating modes, and a display element such as a light emitting diode 8 connected to the display circuit 7 for displaying the operating condition of various operating modes by emitting light. Each of the switches 3, 4 and 5 has a pair of switch segments. The microphone 2 is connected to remote control connecting terminals $t_1$ and $t_2$ of the remote control device through lead wires $l_1$ and $l_2$. Switch segments at one side of respective switches 3, 4 and 5 are connected to remote control connecting terminals $t_3$, $t_4$ and $t_5$ of the remote control device through lead wires $l_3$, $l_4$ and $l_5$, respectively. Switch segments at other side of respective swiches 3, 4 and 5 are connected in common with each other and connected to a remote control connecting terminal $t_6$ of a positive power source. The remote control connecting terminals $t_3$, $t_4$, $t_5$ and $t_6$ are connected to the input detecting circuit 6 through lead wires $l'_3$, $l'_4$, $l'_5$ and $l'_6$, respectively. The input detecting circuit 6 is connected to the light emitting diode 8 through the display circuit 7, and also connected to a remote control connecting terminal $t_7$ for negative power source through a lead wire $l_7$.

The remote control device body 1 thus formed is connected to a body 10 of the tape recorder through a remote control connection cord 9 which comprises a plurality of lead wires. The tape recorder body 10 includes remote control connecting terminals $t_{11}$ to $t_{17}$ coresponding to the remote control connecting terminals $t_1$ to $t_7$ of the remote control device body 1. The connecting terminal $t_{11}$ is connected to a microphone amplifier system 11 through a lead wire $l_{11}$. The connecting terminal $t_{12}$ is connected to a grounded point through a lead wire $l_{13}$. The connecting terminals $t_{13}$ to $t_{17}$ are connected to a main control circuit 12, for example, a large scale integrated circuit (LSI) through lead wires $l_{13}$ to $l_{17}$, respectively. The main control circuit 12 serves for controlling a motor control system and a recording and reproducing amplifier system (both are not shown) by receiving information which represents operation of various kinds of modes such as recording or reproducing, that is, orders to make the recorder operative.

In the remote control device thus constructed when the recording switch 3 is turned on the information representing the recording mode is supplied to the main control circuit 12 of the tape recorder body 10 through a signal path formed by the lead wire $l_3$, the connecting terminal $t_3$, the remote control connection cord 9, the connecting terminal $t_{13}$ and the lead wire $l_{13}$, so that the tape recorder body 10 goes into recording mode. In the same way, the playing switch 4 or the stop switch 5 is turned on the information representing or playing mode or stop mode is supplied to the main control circuit 12 of the tape recorder 10 so that the tape recorder 10 enters the playing mode or stop mode.

In this case when operating switches 3, 4 and 5 of various modes are turned on the supply voltage is applied to the input detecting circuit 6 through lead wires $l'_3$ to $l'_6$ thereby energizing the light emitting diode 8 through the display circuit 7. The light emitting diode 8, therefore, is utilized to confirm operation of the tape recorder caused by the switch-on action of the switches 3, 4 and 5.

The main control circuit 12 of the tape recorder body 10 has the function of temporarily memorizing information on various operating modes, as various kinds of operating switches 3, 4 and 5 a switch of so-called non-locked type is often used which functions only when pushing it. In this case the light emitting diode 8 emits light only when various mode switches are utilized only to confirm the switching-on action thereof. Therefore, it is impossible to detect on the remote control device whether or not the tape recorder body 10 operates with certainty.

In order to eliminate the above disadvantage, a recently developed remote control device is constructed as shown in FIG. 2 in which like reference characters designate corresponding parts shown in FIG. 1. In this remote control device the input detecting circuit 6 is connected to the main control circuit 12 of the tape recorder 10 through a signal path formed by a lead wire $l_8$, a remote control connecting terminal $t_8$, a signal line 13 enclosed in the remote control cord 9, a remote control and a lead wire $l_{18}$, so that information on operation of the tape recorder body 10 is supplied to the input detecting circuit 6 through the above signal path thereby lighting the light emitting diode 8. In this manner, even if a switch of the non-locked type is used as various mode switches 3, 4 and 5, the operation of the tape recorder 10 can be detected on the remote control device with the light of the light emitting diode 8.

According to such a construction, an additional new signal line 13 is required in order to supply the actuating information to the input detecting circuit 6 from the main control circuit 12 of the tape recorder 10. This makes the remote control connection cord 9 thicker by the amount of the additional signal line and effectively produces trouble. In addition thereto the remote control connecting terminals $t_8$ and $t_{18}$ are also necessary so that the number of components increase and the remote control device becomes expensive.

In general, a tape recorder is constructed so that when it is turned on to the recording mode and the playing mode the power supply source is thrown to the motor control system and the recording and reproducing amplifier system and is shut-off with the stop mode and the tape end detected signals. The power voltage, therefore, is supplied to the amplifier system 11 of the tape recorder in the recording mode and playing mode and also supplied to the microphone 2 of the remote control device 1.

SUMMARY OF THE INVENTION

It is an object of the present invention to overcome the above described disadvantages of the conventional remote control device for tape recorder.

It is another object of the present invention to provide a remote control device for tape recorder in which the operation of the tape recorder can be confirmed with certainty by the display element on the remote control device side with the use of a power supply source supplied to the microphone of the remote control device, and result in a provision of inexpensive device.

According to the present invention there is provided a remote control device for tape recorder comprising a microphone unit to be connected to a microphone amplifier system provided in a body of the tape recorder, various kinds of operating switches to be connected to a main control circuit provided in the tape recorder body, and a display means connected to the microphone and to be connected to the microphone amplifier system.

The remote control device further comprises a plurality of remote control connecting terminals to be connected to the remote control connecting terminals of the tape recorder body. The display means comprises an input detecting circuit connected to the operating switches and the microphone for detecting the operating condition of the tape recorder body, a display circuit connected to the input detecting circuit for displaying the operating condition of the tape recorder body and a displaying element connected to the display circuit for displaying the operating condition of the tape recorder body by emitting light. The operating switches are of non-locked type. The displaying element is a light emitting diode.

BRIEF DESCRIPTION OF THE DRAWINGS

With reference to the accompanying drawing.

DESCRIPTION OF THE PREFERRED EMBODIMENT

Figure 1:
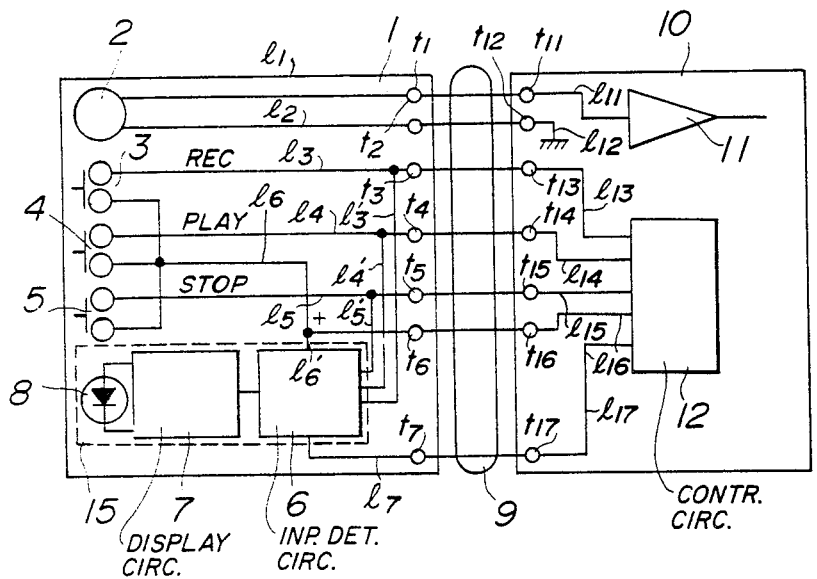
FIGS. 1 and 2 are schematic circuit diagrams showing construction of the conventional remote control device for tape recorder, respectively.
Figure 2:
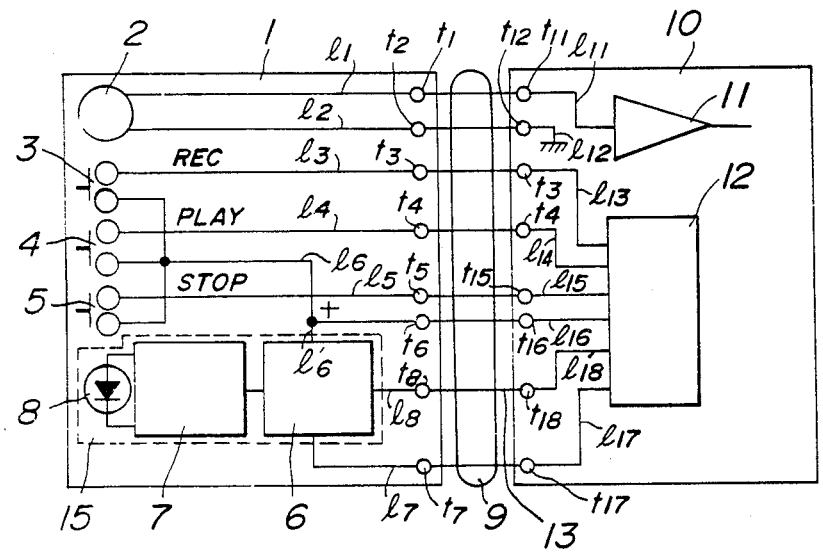
Figure 3:
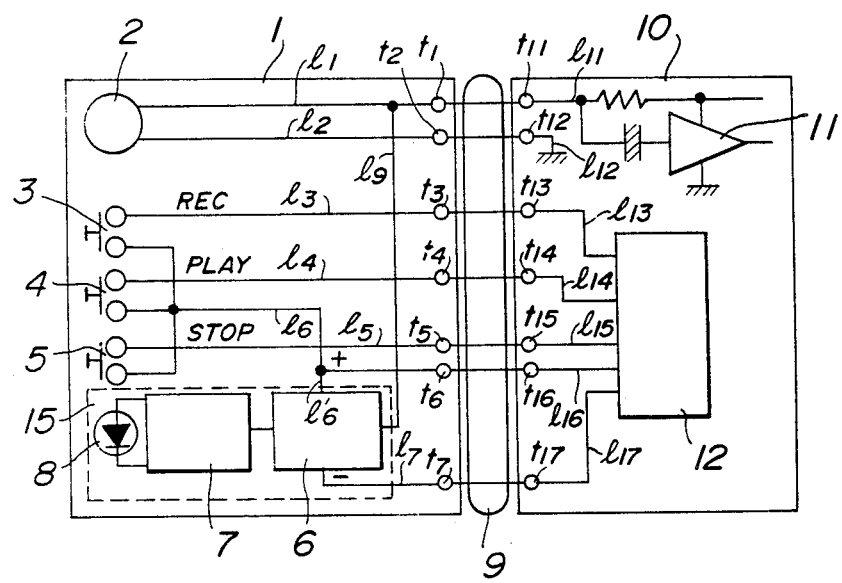
FIG. 3 is a schematic circuit diagram showing one embodiment of a remote control device for tape recorder according to the present invention.

Referring now to the drawings, wherein same reference characters designate the same or corresponding parts shown in FIGS. 1 and 2, an embodiment of a remote control device for tape recorder according to the present invention is shown in FIG. 3. In this embodiment the circuits which connect remote control connecting terminals $t_3$, $t_4$ and $t_5$ shown in FIG. 1 to the input detecting circuit 6 in the display means, that is, lead wires $l'_3$, $l'_4$ and $l'_5$ are omitted and the input detecting circuit 6 is connected through a lead wire $l_9$ to the remote control connecting terminal $t_1$ which is also connected to the microphone 2 through the lead wire $l_1$. That is, in this embodiment the power voltage is supplied to the microphone 2 of the remote control device 1 through a signal path of the lead wire $l_{11}$, the connecting terminal $t_{11}$, the connection cord 9, the connecting terminal $t_1$ and the lead wire $l_1$ and also connected to the input detecting circuit 6 through the signal path of the lead wire $l_{11}$, the connecting terminal $t_{11}$, the connection cord 9, the connecting terminal $t_1$ and the lead wire $l_9$.

The other constructional portion of the remote control device shown in FIG. 3 is the same as that of the remote control device shown in FIG. 1 so that a further explanation of its construction is omitted.

When the recording switch 3 is switched-on the information on the recording mode is supplied to the main control circuit 12 of the tape recorder 10 through a signal path of the lead wire $l_3$, the connecting terminal $t_3$, the connection cord 9, the connecting terminal $t_{13}$ and the lead wire $l_{13}$ so that the tape recorder body 10 is set in the recording mode. The supply source, then, is applied to the amplifier system 11 in the recording mode of the tape recorder 10 so that the power voltage is supplied to the microphone 2 of the remote control device 1 through the signal path of the lead wire $l_{11}$, the connecting terminal $t_{11}$, the connection cord 9, the connecting terminal $t_1$ and the lead wire $l_1$ and also supplied to the input detecting circuit 6 through the lead wire $l_9$ thereby lighting the light emitting diode 8 through the display circuit 7. In this case even if the recording switch 3 is of non-locked type and released after a given time the light emitting diode 8 continues giving off light during the recording mode of the tape recorder 10. When the stop switch 5 is switched-on in such a condition the information on the stop mode is supplied to the main control circuit 12 through a signal path of the lead wire $l_5$, the connecting terminal $t_5$, the connection cord 9, the connecting terminal $t_{15}$ and the lead wire $l_{15}$ so that the tape recorder 10 goes into the stop mode. The supply source of the amplifier system 11, then, is shut-off by the stop mode so that the supply voltage of the input detecting circuit 6 is also shut-off thereby de-energizing the light emitting diode 8. When the end of the tape is detected to generate the tape end detection signal the light emitting diode 8 is de-energized.

When the play switch 4 is switched on the supply source is applied to the amplifier system 11 during the play mode of the tape recorder 10 so that the light emitting diode 8 is energized. In this case the light emitting diode 8 is also de-energized by the switching-on action of the stop switch 5. It is a matter of course that the microphone 2 does not operate during the play mode since the circuit on the grounded side of the microphone 2 is maintained off during the playing mode.

According to such a construction the action of various operating modes in the tape recorder can be confirmed with certainty by the light emitting diode 8 on the remote control device side with the use of the power source supplied to the microphone regardless of type of various mode switches. The input detecting circuit is only connected to the remote control connecting terminal on the non-grounded side of the microphone so that the additional signal line and the connecting terminals thereof are not necesary thereby making the remote control connection cord thin, reducing the number of components and making the remote control device inexpensive. Moreover, when the power voltage is not supplied to the microphone for some causes or other (for example, uncertain insertion of the plug) the light emitting diode is not lit so that the recording failure can be prevented.

It is further understood by those skilled in the art that the forgoing description is a preferred embodiment of the disclosed device and the present invention is not limited thereto and that various changes and modifications may be made in the present invention without departing from the spirit and scope thereof. For example, use can be made of various mode switches other than the above described modes such as recording, playing and stop modes. Therefore, a remote control device having only one mode, such as recording mode can be provided.

What is claimed is:

1. A remote control device for tape recorder having a tape recorder unit with a main control circuit and an amplifier system energized by the control circuit when the latter is set in a predetermined mode, comprising:
a microphone unit to be connected to an amplifier system in the tape recorder unit, a plurality of operating switches to be connected to the main control circuit provided in the tape recorder unit to set the control circuit in one of a plurality of modes, display means for displaying mode conditions, connecting means for connecting the display means to the microphone so as to be connected to the amplifier system, said display means being arranged to respond to energization of said amplifier system via said connecting means and to display a predetermined mode.

2. A remote control device for tape recorder as claimed in claim 1, further comprising a plurality of remote control connecting terminals to be connected to the remote control connecting terminals of the tape recorder unit.

3. A remote control device for tape recorder as claimed in claim 1, wherein the display means comprises an input detecting circuit connected to the operating switches and the connecting means for detecting the operating of the tape recorder unit, a display circuit connected to the input detecting circuit for displaying the operating condition of the tape recorder unit, and a display element connected to the display circuit for displaying the operating condition of the tape recorder unit by emitting light.

4. A remote control device for tape recorder as claimed in claim 1, wherein the operating switches are of non-locked type.

5. A remote control device for tape recorder as claimed in claim 3, wherein the display element is a light emitting diode.

6. A tape recorder comprising:
a tape recorder unit;
a remote control unit;
a cable connecting said remote control unit with said tape recorder unit;
said tape recorder unit having a main control circuit and an amplifier system energized by the main control circuit when the latter is in a predetermined mode;
said remote control unit having a microphone;
first connector means in the cable for connecting the microphone to the amplifier system;
second connector means in the cable for connecting the microphone to the display means;
said display means being arranged to respond to energization of the amplifier system via said first connecting means and second connecting means to display a predetermined mode.

7. A device as in claim 6, wherein said remote control unit and said tape recorder unit each include a plurality of terminals, a plurality of further connecting means connecting the terminals of said remote control unit to the terminals of said tape recorder unit, said terminals in said tape recorder unit being connected to said main control circuit, said terminals of said remote control being connected to said plurality of switches.

8. A device as in claim 6, wherein said display means includes an input detecting circuit connected to said operating switches and said second connecting means for detecting the operation of the tape recorder unit, a display circuit connected to the input detecting circuit for displaying the operating condition of the tape recorder unit, and a display element connected to the display circuit for displaying the operating condition of the tape recorder unit by emitting light.

9. A device as in claim 6, wherein said operating switches are of the non-locking type.

10. A device as in claim 8, wherein the display element is a light-emitting diode.

* * * * *